United States Patent [19]

Davenport

[11] 4,274,717
[45] Jun. 23, 1981

[54] OPHTHALMIC PROGRESSIVE POWER LENS AND METHOD OF MAKING SAME

[75] Inventor: Lawrence J. Davenport, Downey, Calif.

[73] Assignee: Younger Manufacturing Company, Los Angeles, Calif.

[21] Appl. No.: 40,235

[22] Filed: May 18, 1979

[51] Int. Cl.³ .................................................. G02C 7/06
[52] U.S. Cl. ........................................ 351/169; 351/177
[58] Field of Search ................................. 351/169, 176

[56] References Cited
U.S. PATENT DOCUMENTS

| | | | |
|---|---|---|---|
| 3,785,724 | 1/1974 | Cretin-Maitenaz | 351/169 |
| 4,056,311 | 11/1977 | Winthrop | 351/169 |

*Primary Examiner*—John K. Corbin
*Assistant Examiner*—Scott J. Sugarman
*Attorney, Agent, or Firm*—James E. Brunton

[57] ABSTRACT

An improved ophthalmic lens made of refractive material and having varying focal length, said lens having two refractive surfaces one of which is divided into first, second and third viewing zones intended respectively for distant vision, intermediate vision and near vision. The first viewing zone of the lens occupies substantially the upper half of said one surface and has a substantially constant curvature providing a substantially constant focal length for distant vision. The third zone of the lens occupies the lower central portion of said one surface and has a substantially constant curvature providing a substantially constant focal length for near vision. The second zone of the lens lies between the first and third zones and has a varying curvature providing a varying focal length, the curvature of the second zone varying progressively from the substantially constant curvature of the third zone. The improvement in the lens consists in the novel manner in which the lens surface comprising the second viewing zone is generated so as to provide a uniquely configured, strategically located intermediate viewing zone which is totally free of astigmatism and distortion.

8 Claims, 11 Drawing Figures

OPHTHALMIC PROGRESSIVE POWER LENS AND METHOD OF MAKING SAME

BACKGROUND OF THE INVENTION

1. Field of the Invention

The present invention relates generally to ophthalmic lenses. More particularly the invention relates to ophthalmic lenses having progressively varying focal power.

2. Discussion of the Prior Art

The human eye is a wonderful and sensitive organ. It has a lens which is on the outer surface of the eye to receive light from objects in the field of view of the eye. It also has a retina which is positioned in back of the lens to serve as a viewing screen for objects properly focused by the eye lens. When the normal eye views relatively distant objects, the lens is in the relaxed position, and in this position, has the proper curvature on its surface to focus the object on the retina.

Upon the observance of objects at close range, however, eye muscles surrounding the lens act upon the lens to increase its curvature and decrease the focal length of the lens just sufficient to focus the image of the near object on the retina. This ability of the eye to adjust itself for varying object distances is known as "accommodation." As the age of a human being increases, his power of accommodation decreases. This results from the fact that his eye muscles become stiff and weak. For example, a child can normally change the focal powers of his eye by more than 14 Diopters. In middle age, the power of accommodation is reduced to about 3 Diopters, and in old age, the power of accommodation may disappear entirely.

Multifocal lenses such as bifocal and trifocal lenses have been devised to aid the vision of persons who suffer from reduced powers of accommodation. The bifocal lens, for example, is in effect formed from two separate segments of different dioptic powers. The power of one segment is such that vision through it permits focusing on near objects such as reading matter. The other segment corrects the vision for viewing distant objects.

Trifocal lenses are in effect formed from three separate segments of different dioptic powers. These lenses are similar to the bifocal lens, but also include an intermediate viewing segment.

A serious drawback of prior art multifocal lenses resides in the fact that there are optically sharp differences between the viewing portions. This gives rise to confusion when the line of sight scans the optical demarcation lines dividing the segments. This confusion is not only annoying to the user, but also can be quite dangerous causing on occasion serious injury due to falls down stairs and the like.

Several attempts have been made in the past to eliminate lines of optical demarcation in bifocal or trifocal lenses. One solution to this problem is to provide an intermediate region between the near and far vision segments having properties that vary gradually with distance over the surface so as to provide a gradual transition between the near and distance portions of the lens. Such lenses are frequently referred to as "progressive" lenses.

A progressive lens of typical prior art design comprises two refractive surfaces on opposite sides of a block of refringent material. The first (inner) of the two refractive surfaces is usually a spherical or toric surface and the second (outer-convex) is the so-called progressive surface.

This progressive surface is typically designed and manufactured to present an upper single focus spherical surface portion providing a far vision zone or lens portion. This portion has a first focal power and the optical center thereof is the optical center of the whole progressive lens.

Also presented is a lower single focus spherical surface portion which provides the near or reading vision zone or lens portion. This portion has a second higher focal power and is located around a point called the near vision center.

Finally there is presented an intermediate progressive surface portion of which the meridian curve extending from the optical center of the lens to the near vision center is called the meridian of progression. The spherical power of the lens varies along this meridian of progression from its value at the optical center of the lens to its value at the top of the near vision center according to a predetermined law.

The following U.S. Pat. Nos. are illustrative of prior art so called progressive lenses and represent the most pertinent prior art known to applicant: 2,869,422 Cretin-Maitenaz, 2,878,721 Kanolt, 3,785,724 Cretin-Maitenaz, 4,055,379 Winthrop, 4,056,311 Winthrop.

Additionally, articles by A. G. Bennette in the October and November, 1970 and the February and March, 1971 issues of "The Optician" discuss various attempts to provide progressive lenses.

All prior art progressive lenses exhibit at least one common drawback. As an incident of the aspherical surface of the character found in the prior art progressive lens, a certain amount of astigmatism and distortion typically existed. This distortion tended to be particularly pronounced at the peripheral portions of the transistion or intermediate viewing zone of the lens. The undesirable result of this distortion was a swimming sensation experienced by the wearer when the head was moved in normal fashion. This effect, along with a blurring of vision through the peripheral areas of the lens, has largely been responsible for previous lack of wide acceptance of the progressive lens.

As will become apparent from the discussion which follows, the drawbacks of prior art progressive lenses have been effectively overcome in the unique lens of the present invention, and, in a highly novel manner, the areas of the lens normally exhibiting pronounced distortion have been relocated to those portions of the lens which are minimally used by the wearer of the lens.

SUMMARY OF THE INVENTION

It is an object of the present invention to provide a new and unique progressive power ophthalmic lens in which astigmatism and distortion in the peripheral areas of the lens commonly used in normal viewing is significantly decreased.

It is another object of the invention to provide a progressive power lens of the aforementioned character in which the viewing portions of the zone intermediate of the far distance and near distance viewing zones most frequently used by the wearer are uniquely configured and stratigically located to markedly reduce blur or distortion when the wearer is looking at objects in the intermediate range.

It is another object of the invention to provide a new multifocal lens in which the lines of demarcation between the far distance, the transitional and the near distance viewing zones are rendered invisible.

Still another object is to provide a progressive lens of the above character which can be relatively easily and inexpensively formed on a reproducible basis and is capable of large quantity manufacture.

A still further object is to provide a method of forming a progressive lens having an intermediate portion uniquely configured to produce a minimum amount of blur and distortion in those portions most used by the wearer.

These and other objects are realized by the unique lens of the present invention which may be described briefly as comprising a refractive material having two refractive surfaces one of which is divided into first, second and third uniquely configured zones intended respectively for distant vision, intermediate vision and near vision, said one surface having a substantially vertical meridian lying in an x y plane and passing through the optical center of the lens and traversing said zones, the curvature of said meridian being characterized by the expression:

$$\frac{1}{R} = \frac{d^2x}{dy^2}\left[1 + \left(\frac{dx}{dy}\right)^2\right]^{-3/2}.$$

As illustrated in FIG. 1 of the drawings, the first zone of said lens occupies the upper half of the said one surface plus somewhat pie shaped peripheral portions disposed below the horizontal axis of the lens and has a substantially constant curvature providing a substantially constant focal length for distance vision. The third zone of said lens occupies a lower portion of said one surface and has a substantially constant curvature providing a substantially constant focal length for near vision. The second zone lies between said first and third zones and has a varying curvature providing a varying focal length, the curvature of said second zone at successive points along said meridian varying progressively from the substantially constant curvature of said first zone to the substantially constant curvature of said third zone.

The one surface of said lens is uniquely generated by portions of a family of circles generated by passing an inclined plane through a multiplicity of spheres of known radius each of said spheres passing through a sequence of points which points define said meridional curve.

DESCRIPTION OF ONE EMBODIMENT OF THE INVENTION

Figure 1:
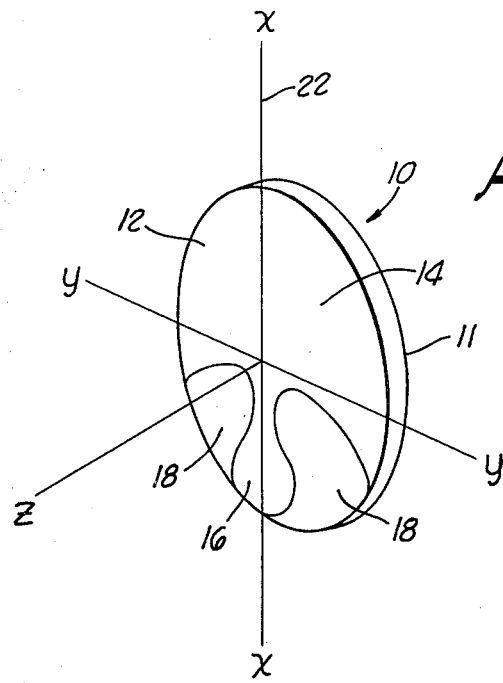
FIG. 1 is an isometric view of one form of the progressive power ophthalmic lens of the invention illustrating the configuration and location of the distant vision, intermediate vision and near vision viewing zones.
Figure 3:
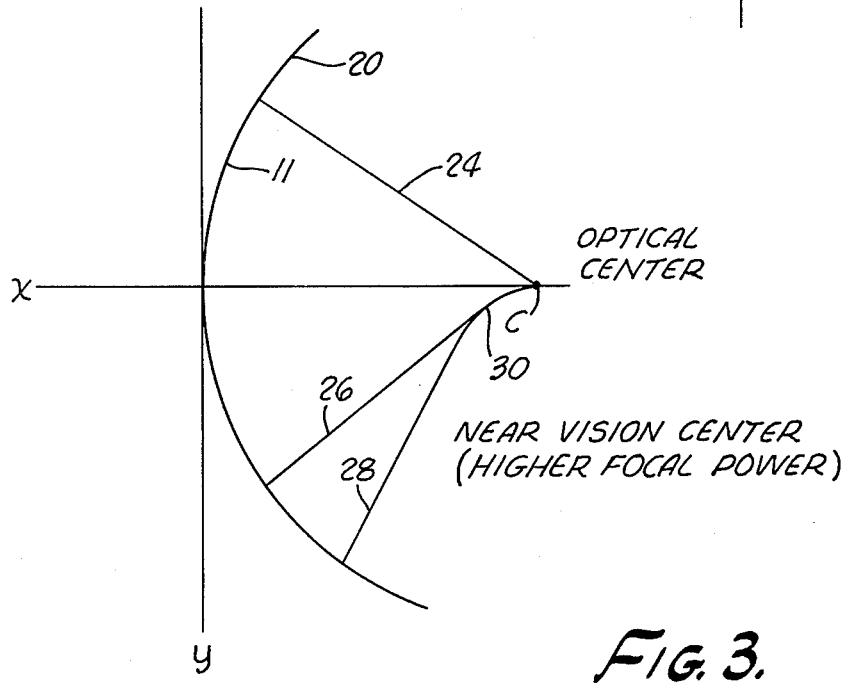
FIG. 3 is an explanatory diagram illustrating the manner of derivation of the curvature of the meridional curve in the x,y plane of the lens.

Referring to the drawings, and particularly to FIGS. 1 and 3, there is shown one form of a progressive power ophthalmic lens 10 of the present invention. The lens 10 comprises two refractive surfaces formed on opposite sides of a block of refrigent material, the back refractive surface 11 being a simple surface and front refractive surface 12 being a so-called progressive surface. The simple surface and the progressive surface determine therebetween an upper single focus lens portion or first viewing zone 14 for far vision having a first focal power and the optical center of which coincides with the optical center of the whole lens, a lower single focus lens portion, or third viewing zone 16, for near vision having a second higher focal power and which is located around a point called the near vision center, and an intermediate progressive power lens portion or second viewing zone 18, extending from the optical center of the lens to the near vision center and on either side of the meridian plane of the lens containing the near vision center.

As illustrated in FIG. 1, the second, or intermediate viewing zone 18, has a unique shape and is stratigically located between the first and third viewing zones to provide a proper transition with minimal distortion or blur as the eye of the user moves relative to the lens to focus upon objects disposed at an intermediate distance. As depicted in FIG. 3, the focal power in the intermediate viewing zone progressively increases from a first focal power at the optical center of the lens to a second higher focal power at the near vision center according to a predetermined law of progression along the meridian plane containing the near vision center and the meridian plane of progression. The novel manner in which the surface defining this unique third viewing zone is generated will be discussed in detail in the paragraphs which follow.

The lens 10 may be constructed of an optical material having a uniform refractive index such as optical quality glass or it may be constructed of one of the well-known optical quality plastic materials such as CR-39 (allyl diglycol carbonate), Lexan (polycarbonate) or methyl methacrylate.

As best seen by referring to FIGS. 1 and 3, zones 14, 16 and 18 are curved inwardly towards the eye with progressive increases in distance upwardly along the progressive power lens. This may be seen in FIG. 3 by a curve 20, which represents the meridional curve of the lens. The term "meridional curve" relates to the curve formed by the lens along a line 22 in FIG. 1 which in effect divides the lens into equal halves. Each position on one half has a corresponding position with similar properties of curvature and focal power in the other half.

Meridional curve 20 is a smooth curve at every position and has no discontinuities and breaks. Although it is smooth, the meridional curve, as previously indicated, may have a different radius of curvature at every position. Radii of curvature at different positions along the meridional curve 20 are illustrated at 24, 26 and 28 in FIG. 3. The locus of the centers of curvature "C" of the meridional curve comprises a continuous plane curve known as the "evolute" of the given curve. A typical evolute is illustrated at 30 in FIG. 3. In order for the lens to function properly, the evolute should be smooth and should have no discontinuities at any point.

Figure 2:
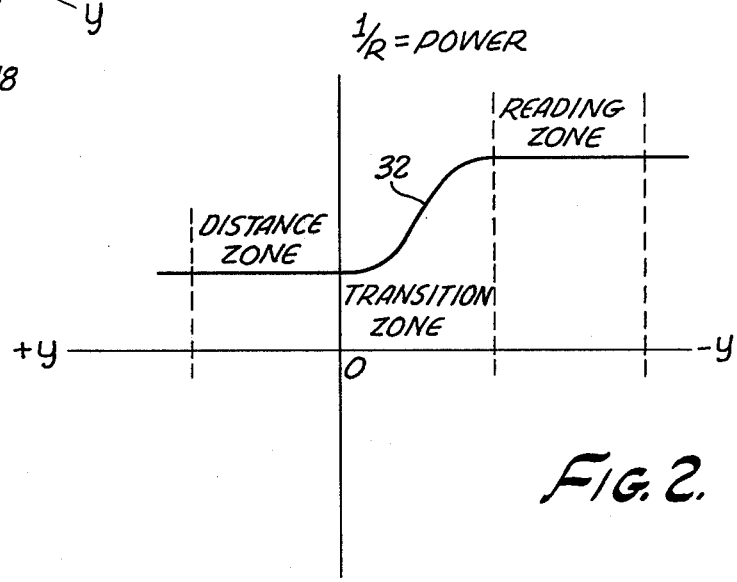
FIG. 2 is an explanatory diagram illustrating the shape of the meridional curve in terms of the reciprocal of its radius and the y axis of the lens.

Referring now to FIG. 2, the reciprocal of the radii of curvature "R" at different positions along the meridional curve is plotted relative to the y axis of the lens as said axis is defined in FIG. 1. It is to be noted that throughout the distance zone and the near or reading zone, the radius of curvature along the meridional curve is constant. Throughout the intermediate, or transition zone, however, the radii of curvature vary as indicated by the progressive plane curve designated by the numeral 32 in FIG. 2. The desired shape of the progressive meridional curve 32 may be determined by well known laws of progression, the formula therefore being expressed as follows in terms of the radius R and the x and y coordinates of the lens 10 (FIG. 1):

$$\frac{1}{R} = \frac{d^2x}{dy^2}\left[1 + \left(\frac{dx}{dy}\right)^2\right]^{-3/2}.$$

The thrust of the present invention resides in the novel way in which the surface of the lens in the intermediate zone 18, FIG. 1 is generated. In the paragraphs which follow, the mathematical calculations for defining this unique lens surface will be discussed in detail. Basically, however, the surface is generated by portions of a family of circles developed by passing an inclined plane through a multiplicity of spheres of known radius, each of said spheres passing through the sequence of points which define the meridional curve.

Figure 4:
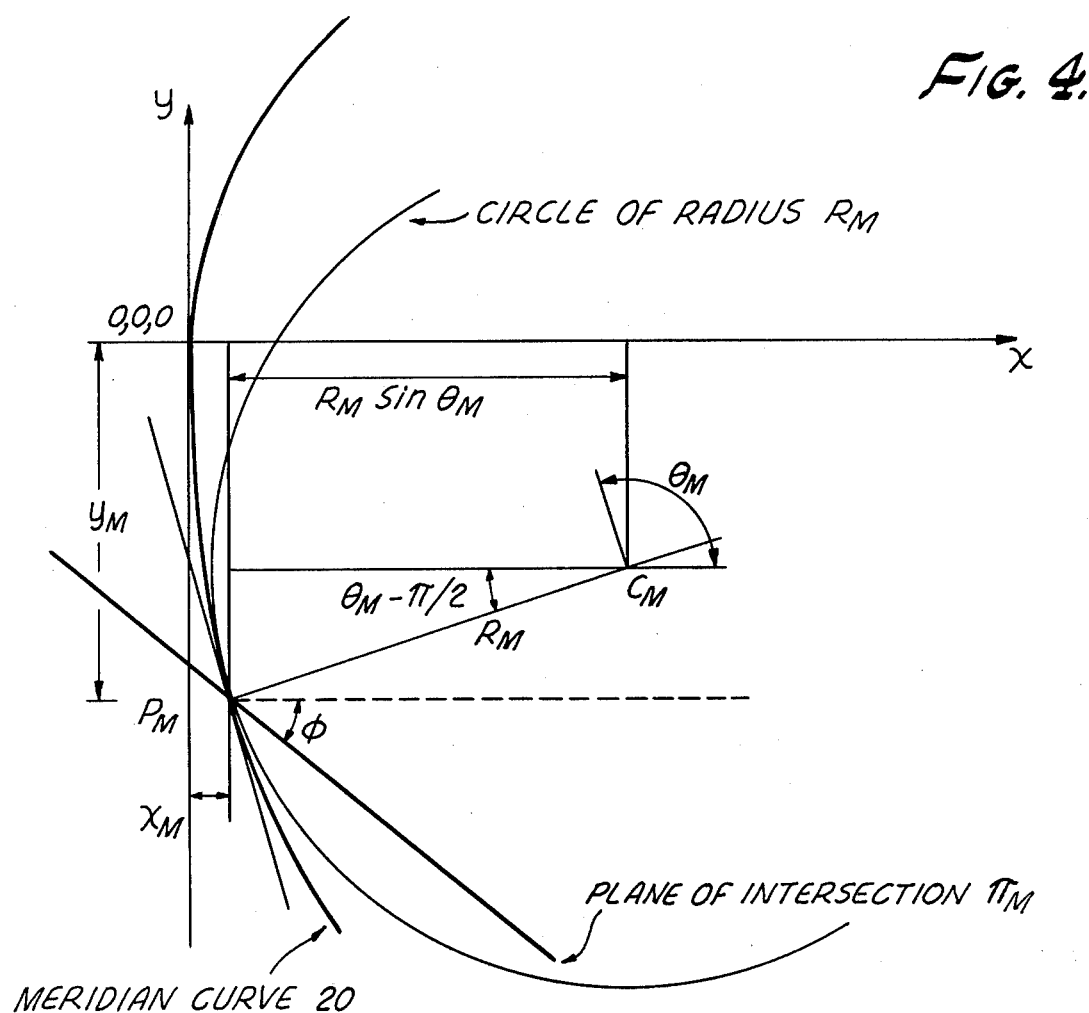
FIG. 4 is a further explanatory diagram illustrating the manner by which the lens surface is mathmatically defined by the passage of inclined planes through spheres of known radii which spheres pass through the multiplicity of points defining the meridional curve of the lens.
Figure 5:
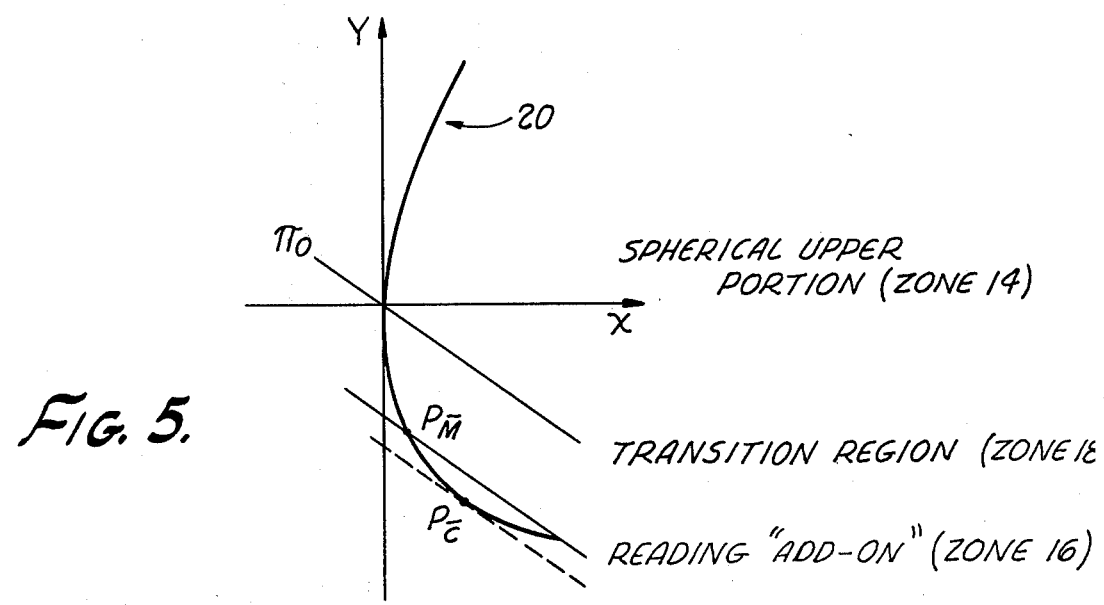
FIG. 5 is a diagram somewhat similar to FIG. 4 further illustrating the location of the three viewing portions of the lens.
Figure 6:
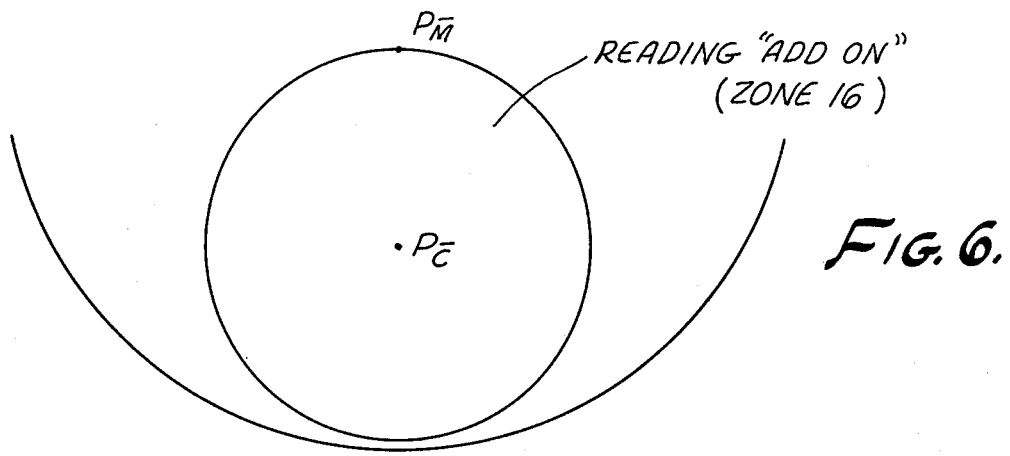
FIG. 6 is a diagram to be considered in connection with FIG. 5 illustrating the configuration and location of the near distance viewing portion of the lens.
Figure 7:
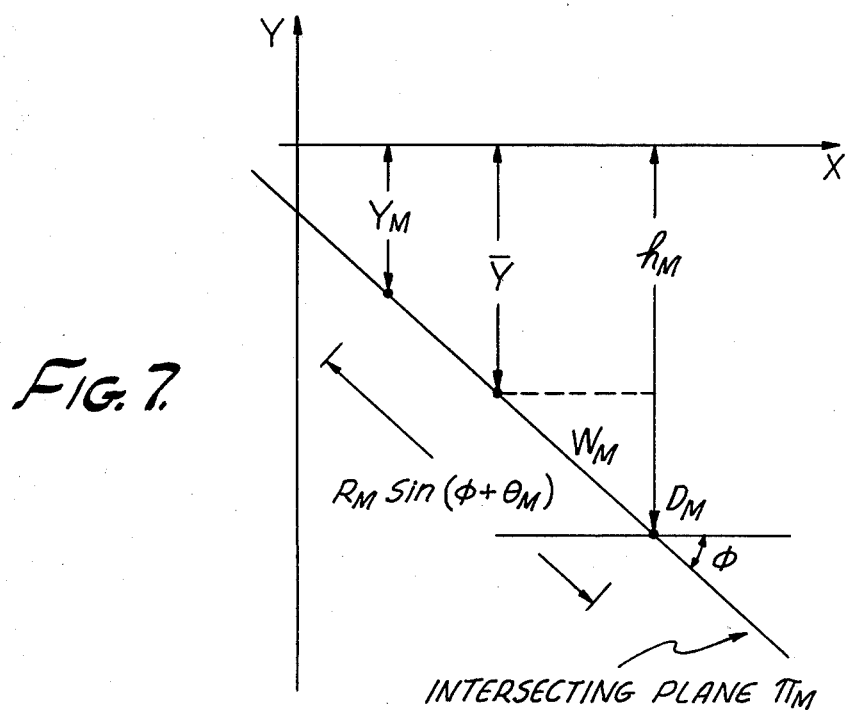
FIG. 7 is an explanatory diagram mathematically defining the geometry of the lens in the x,y plane.
Figure 8:
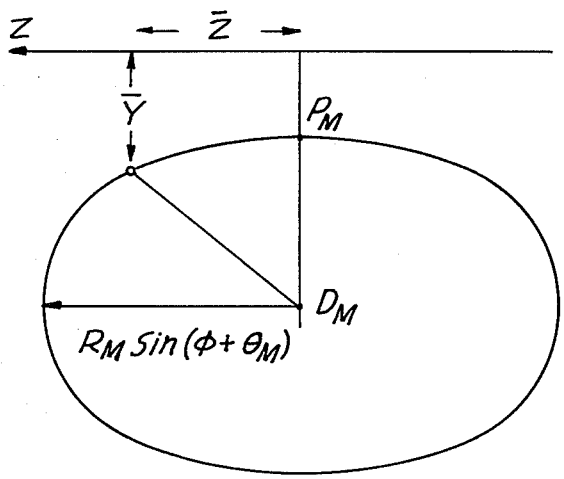
FIG. 8 is a further explanatory diagram showing the configuration of one of the elipses generated by passing the inclined plane through a given sphere passing through a particular point on the meridional curve.

Referring to FIG. 4, the meridional curve 20 is shown lying in the xy plane of the three-dimensional rectangular xyz coordinate system illustrated in FIG. 1. Curve 20 is tangent to the positive y axis at the origin (O,O,O).

Meridional curve 20 may be defined in tabular form by a sequence of points $P_M$, which points may be calculated for any given lens design in accordance with the laws of progression using the formula previously set forth. At each point $P_M$, there is a given radius of curvature $R_M$ and a given angle $\theta_M$ which, as shown in FIG. 4, is the angle between the tangent line to curve 20 and the positive x axis. Thus one can associate with each point $P_M$ on the meridional curve a quintuplet of real numbers:

$$(x_M, y_M, O, R_M, \theta_M)$$

of which the first three $(x_M, y_M, O)$ represent the rectangular coordinates of the point $P_M$. The center $C_M$ of the circle of curvature at $P_M$ has the coordinates $$(x_M + R_M \sin \theta_M,\ y_M - R_M \cos \theta_M,\ O)$$

Let us now pass a sphere $\Sigma_M$ of radius $R_M$ through the point $P_M$, which has its center at $C_M$, and then let us cut this sphere by a plane $\pi_M$ through $P_M$ which is perpendicular to the xy-plane. This plane $\pi_M$ intersects the yz-plane in a straight line parallel to the z-axis and the xy-plane in a straight line passing through the point $P_M$. The angle $\phi$ by which the latter line of intersection is inclined below the positive x-axis is assumed to be independent of the point $P_M$ and a given constant throughout.

It is clear that the plane $\pi_M$ through $P_M$ cuts the sphere $\Sigma_M$ in a circle $S_M$ which passes through $P_M$ and has radius $R_M \sin(\phi + \theta_M)$. Hence, as the point $P_M$ moves along the meridian curve, the family of circles $S_M$ generates a surface. The part of the surface that "faces" the yz-plane is the desired lens surface L.

Turning also to FIGS. 5 through 8 of the drawings, the following mathematical description of the lens surface L allows the effective computation of the coordinates of the points of that surface.

Every point P on the lens surface L generated through the points $P_M$ on the meridian curve 20 has the rectangular coordinates $$\begin{aligned} x &= x_M + R_M \sin(\phi + \theta_M) \cos\phi(1 - \cos t) \\ y &= y_M - R_M \sin(\phi + \theta_M) \sin\phi(1 - \cos t) \\ z &= R_M \sin(\phi + \theta_M) \sin t \end{aligned} \quad (1)$$

where $(x_M, y_M, O, R_M, \theta_M)$ is the quintuplet associated with the corresponding point $P_M$ and t is a real parameter ranging over the interval $O \leq t \leq 2\pi$.

The derivation of the equations (1) use the fact that the circle $S_M$ cut from the sphere $\Sigma_M$ by the plane $\pi_M$ through the point $P_M$ is centered at the point $D_M$ with coordinates $$(x_M + R_M \sin(\phi + \theta_M) \cos \phi,\ y_M - R_M \sin(\phi + \theta_M) \sin \phi,\ O). \quad (2)$$

This circle $S_M$ has radius $R_M \sin(\phi + \theta_M)$ and passes through the point $P_M$, as noted before. Thus, any point P on that circle $S_M$ has the coordinates given by (1) where t denotes the angle, in the plane of intersection $\pi_M$, from the xy-plane to the straight line that joins the point P with the center $D_M$, whose coordinates are given by (2). Throughout, the angle t will be measured as positive in the counterclockwise direction of the positive z-axis.

It is to be understood that all computations thus far have been carried out under the following special assumptions:

(i) The portion of the meridian curve 20 "above" the x z-plane, i.e. the part of 20 whose points have coordinates $(x_M, y_M, O)$ with $y_M \geq O$, is a circular arc of radius $R_o > O$ defined by the equation $$x_M = R_o - (R_o^2 - y_M^2)^{\frac{1}{2}}.$$

(ii) The portion of the meridian curve 20 "below" the x z-plane, i.e. the part of 20 whose points have coordinates $(x_M, y_M, 0)$ with $y_M < 0$, contains a circular arm of radius $R > 0$, which generates the reading "add-on" of the lens. The "highest" point $P_{\overline{M}}$ on this circular arc of 20 has the coordinates $(x_{\overline{M}}, y_{\overline{M}}, 0)$ with $x_{\overline{M}} > 0$, $y_{\overline{M}} < 0$, and the coordinates of its midpoint ("center") $P_{\overline{C}}$ are $(x_{\overline{C}}, y_{\overline{C}}, 0)$ where $x_{\overline{C}} > x_{\overline{M}}$ and $y_{\overline{C}} < y_{\overline{M}}$.

(iii) The angle $\phi$ by which the intersecting planes $\pi M$ are inclined below the x z-plane and the angle $\theta_{\overline{C}}$ of the tangent line to the circular arc of 20 at $P_{\overline{C}}$ are linked by the relation $$\phi + \theta_{\overline{C}} = \pi.$$

Thus, the "lowest" point of the circular arc of 20 generating the reading "add-on" is the point of intersection of that arc with the plane $\pi_{\overline{M}}$ through the "highest" point $P_{\overline{M}}$.

As a result of these assumptions, the entire lens surface L is naturally divided into the three previously identified mutually exclusive viewing zones, that is (see FIGS. 1, 2 and 5):

The first, or far vision zone 14 disposed above the intersecting plane $\pi_O$ through the origin (0,0,0), which is a spherical surface of radius $R_o$.

The second, or transition zone 18 disposed between the intersecting plane $\pi_O$ and the intersecting plane $\pi_{\overline{M}}$ through the "highest" point $P_M$ of the reading "add-on."

The third near vision reading "add-on", zone 16 which is a spherical cap disposed below the intersecting plane $\pi_{\overline{M}}$ through $P_{\overline{M}}$, and each of the zones 14, 16 and 18 admit simple analytic descriptions in terms of the coordinates of their points.

All points in the first zone 14 of the lens have coordinates $(\bar{x}, \bar{y}, \bar{z})$ satisfying both the inequality $$(1 + \frac{\bar{y}}{R_o \cos\phi \sin\phi})^2 + (\frac{\bar{z}}{R_o \cos\phi})^2 \geq 1 \quad \text{(IE1)}$$

and the equation $$\bar{x} = R_o - (R_o^2 - \bar{y}^2 - \bar{z}^2)^{\frac{1}{2}}.$$

Similarly, all points of the third zone 16 generating the reading "add-on" have coordinates $(\bar{x}, \bar{y}, \bar{z})$ satisfying both the inequality $$(1 + \frac{\bar{y} - y_{\overline{M}}}{R \sin(\phi + \theta_{\overline{M}}) \sin\phi})^2 + (\frac{\bar{z}}{R \sin(\phi + \theta_{\overline{M}})})^2 \leq 1 \quad \text{(IE2)}$$

and the equation $$\bar{x} = \hat{x} - (R^2 - (\bar{y} - \hat{y})^2 - \bar{z}^2)^{\frac{1}{2}}$$

where $$\hat{x} = x_{\overline{M}} + R \sin\theta_{\overline{M}}, \quad \hat{y} = y_{\overline{M}} - R \cos\theta_{\overline{M}}.$$

The coordinates of all points in the unique transition, or intermediate zone 18 disposed between the intersecting planes $\pi_O$ and $\pi_M$ must satisfy the original set of equations, namely $$\bar{x} = x_M + R_M \sin(\phi + \theta_M) \cos\phi (1 - \cos t) \quad \text{(E3)}$$
$$\bar{y} = y_M - R_M \sin(\phi + \theta_M) \sin\phi (1 - \cos t)$$
$$\bar{z} = R_M \sin(\phi + \theta_M) \sin t$$

More precisely, for any point with coordinates $(\bar{x}, \bar{y}, \bar{z})$ for which $\bar{y}$, $\bar{z}$ fail to satisfy both inequalities (IE1) and (IE2), the quintuplet $(x_M, y_M, 0, R_M, \theta_M)$ and the parameter $t$ must be so determined for some point $P_M$ on the meridian curve 20 (below the x z-plane) that all three equations (E3) hold simultaneously.

The computational procedure used for calculating the coordinates of the points of the lens surface L is based entirely on the analytic representation of the boundries of the transition regions in terms of the quadratic inequalities (IE1) and (IE2) given above.

In the actual manufacture of the lens of the present invention, a machine such as a numerically controlled milling machine is programmed either to produce the lens from a lens blank of suitable material or to produce a mold from which the lens can be cast from either an optical quality glass or a polymerizable material. The techniques for programming and operating numerically controlled machines as well as for precision casting of lens shapes using suitable molds is described in the literature and is well known to those skilled in the art. The precise details of computational implementation of the invention, programming the milling machine and casting the lens, therefore, will not be discussed herein.

The highly novel lens of the present invention, when produced in accordance with the previously set out procedures and mathmatical calculations is characterized by having the uniquely configured and strategically located first, second and third viewing zones illustrated in FIG. 1. The unique shape of these viewing zones, which is optimized for normal viewing by the wearer of the lens, results from the surface of the lens in the intermediate viewing zone being generated by portions of a family of circles developed by passing the inclined plane $\pi$ (FIGS. 4 and 5) through a multiplicity of spheres of known radius each of said spheres passing through the sequence of points which define the meridional curve 20.

Figure 9:
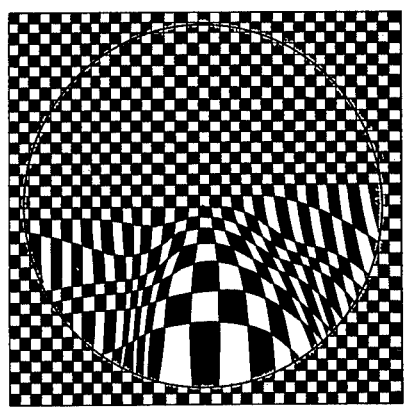
FIG. 9 is an illustrative diagram of the images of a square grid as viewed through a typical prior art progressive lens.
Figure 10:
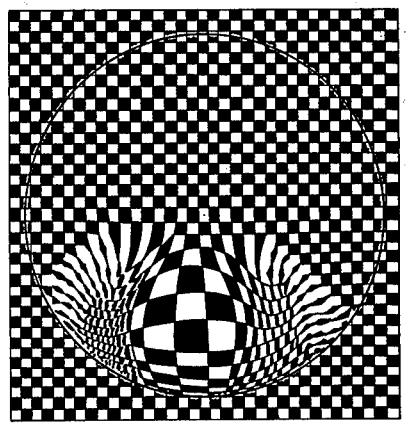
FIG. 10 is an illustrative diagram similar to FIG. 9 of the images of a square grid as viewed through one embodiment of the novel progressive lens of the present invention.

As vividly illustrated in FIG. 10 of the drawings, which is an example of an image of a lens of the present invention, distortion is kept to an absolute minimum throughout the most used portions of the lens. A comparison of the image of a typical prior art progressive lens, as shown in FIG. 9, with the image of the lens of the present invention at once shows the vast improvement over the prior art. Of particular note is the marked improvement in the distortion characteristics of the lens in the peripheral areas of the lens immediately below the z axis and throughout the most frequently used portions of the intermediate viewing zone 18.

Figure 11:
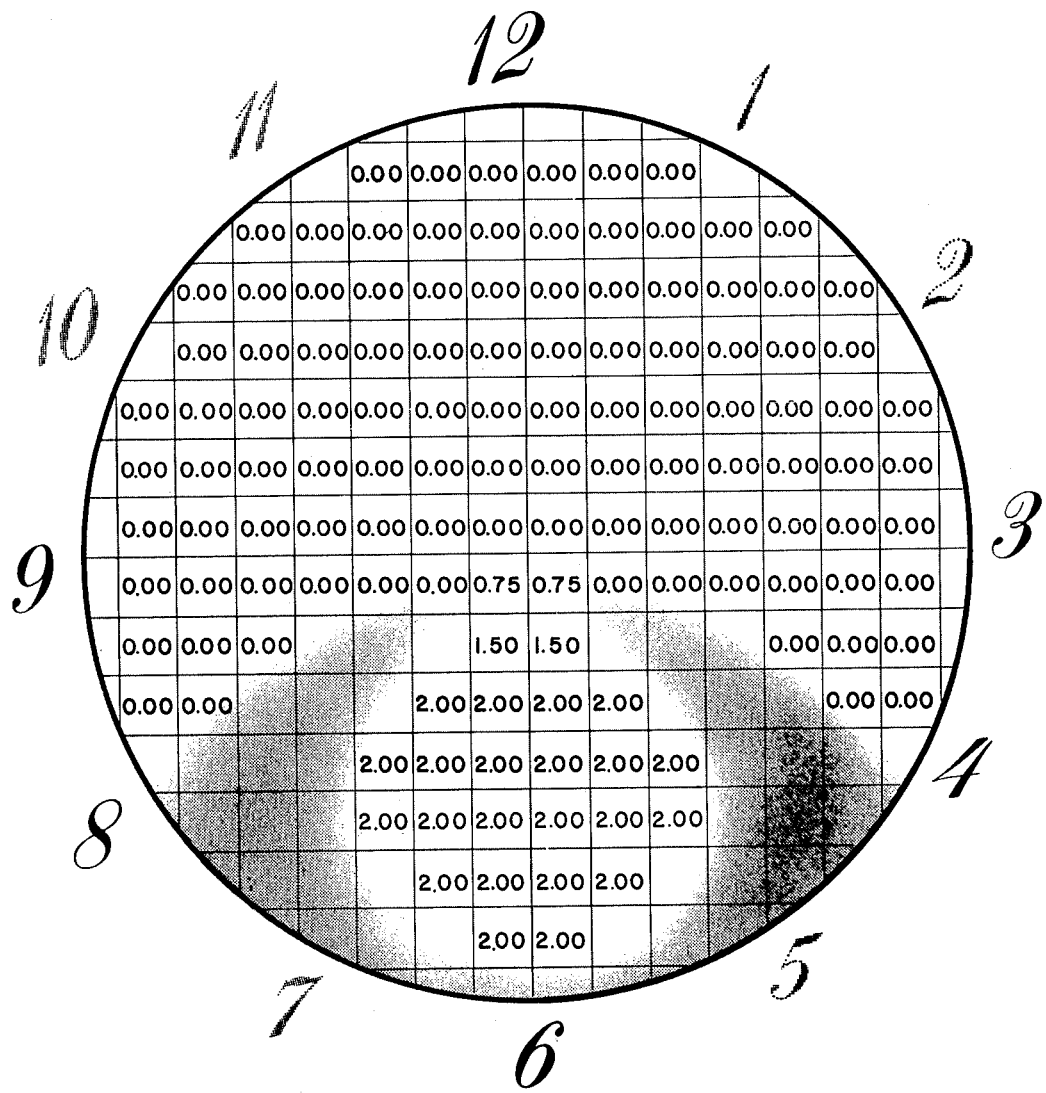
FIG. 11 is an illustrative diagram giving power coordinates in diopters on a 2 add lens defining a surface shape of one form of progressive lens made in accordance with the principles of the present invention.

To aid in understanding the power coordinates of a typical lens of the present invention, such as, for example, the lens exhibiting the image shown in FIG. 10, there is set forth in FIG. 11 the results obtained with lenses having a rear surface formed in accordance with the descriptions herein.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

What is claimed is:

1. An improved ophthalmic lens with progressively varying focal length having two refractive surfaces, one of which is divided into first, second and third viewing zones intended respectively for distant vision, intermediate vision and near vision, said one surface including a meridional curve passing through the optical center of the lens and traversing said zones, said meridional curve being defined by a sequence of points on said one surface and substantial peripheral portions of the lower half of said one surface and having a substantially constant curvature providing a substantially constant focal length for distant vision, said third viewing zone occupying a lower portion of said one surface providing a substantially constant focal length for near vision, and said second viewing zone lying between said first and third viewing zones providing for intermediate vision, said second viewing zone further having on each side of the meridian substantially symmetrical zones of astigmatism aberrations said one surface of said second viewing zone being generated by portions of a family of circles developed by passing an inclined plane through a multiplicity of spheres of predetermined radius, each of said spheres being tangent to said sequence of points defining said meridional curve.

2. An improved ophthalmic lens as defined in claim 1 in which every point on the surface of the lens generated through said sequence of points defining said meridional curve has the following rectangular coordinates:

$$x = x_M + R_M \sin(\phi + \theta_M) \cos\phi(1 - \cos t)$$

$$y = y_M - R_M \sin(\phi + \theta_M) \sin\phi(1 - \cos t)$$

$$z = R_M \sin(\phi + \theta_M) \sin t$$

where $(x_M, y_M, 0, R_M, \theta_M)$ is the quintuplet associated with a corresponding point of said sequence of points and t is a real parameter ranging over the interval $0 \leq t \leq 2\pi$.

3. An improved ophthalmic lens as defined in claim 2 in which:
   (a) the portion of said meridional curve included in said first viewing zone is a circular arc of radius $R_o > 0$ defined by the equation:

$$X_M = R_o - (R_o^2 - y_M^2)^{\frac{1}{2}}; \text{ and}$$

(b) all points in said first viewing zone have coordinates $(\bar{x}, \bar{y}, \bar{z})$ satisfying both the inequality $$(1 + \frac{\bar{y}}{R_o \cos\phi \sin\phi})^2 + (\frac{\bar{z}}{R_o \cos\phi})^2 \geq 1$$

and the equation $$\bar{x} = R_o - (R_o^2 - \bar{y}^2 - \bar{z}^2)^{\frac{1}{2}}.$$

4. An improved ophthalmic lens as defined in claim 2 in which all points in said third viewing zone have coordinates $(\bar{x}, \bar{y}, \bar{z})$ satisfying both the inequality $$(1 + \frac{\bar{y} - y_{\bar{M}}}{R\sin(\phi + \theta_{\bar{M}})\sin\phi})^2 + (\frac{\bar{z}}{R\sin(\phi + \theta_{\bar{M}})})^2 \leq 1$$

and the equation $$\bar{x} = \hat{x} - (R^2 - (\bar{y} - \hat{y})^2 - \bar{z}^2)^{\frac{1}{2}}$$

where $$\hat{x} = x_{\bar{M}} + R\sin\theta_{\bar{M}}, \quad \hat{y} = +y_{\bar{M}} - R\cos\theta_{\bar{M}}.$$

5. An improved ophthalmic lens as defined in claim 4 in which all points in said second zone have coordinates $(\bar{x}, \bar{y}, \bar{z})$ satisfying the following equations:

$$\bar{x} = x_M + R_M \sin(\phi + \theta_M) \cos\phi(1 - \cos t)$$

$$\bar{y} = y_M - R_M \sin(\phi + \theta_M) \sin\phi(1 - \cos t)$$

$$\bar{z} = R_M \sin(\phi + \theta_M) \sin t$$

6. A method of making an improved ophthalmic lens having an x, y and z axis with progressively varying focal length characterized by having two refractive surfaces, one of which is divided into first, second and third viewing zones intended respectively for distant vision, intermediate vision and near vision said one surface including a meridional curve passing through the optical center of the lens and traversing said zones, said meridional curve being defined by a sequence of points on said one surface said first zone occupying the upper half of said one surface and substantial peripheral portions of the lower half of said one surface and having a substantially constant curvature providing a substantially constant focal length for distant vision, said third viewing zone occupying a lower portion of said one surface providing a substantially constant focal length for near vision, and said second viewing zone lying between said first and third viewing zones providing for intermediate vision, said second viewing zone further having on each side of the meridian substantially symmetrical zones of astigmatism aberrations, the improvement consisting of a method of generating said one surface of said second viewing zone by combining together to form said surface a multiplicity of circles developed by passing an inclined plane disposed at a predetermined angle relative to said axis of the lens through a multiplicity of spheres of predetermined radius, each of said spheres passing through said sequence of points defining said meridional curve said radius of said spheres and said angle of said inclined plane being selected so that every point on said surface has the following rectangular coordinates:

$$x = x_M + R_M \sin(\phi + \theta_M) \cos\phi(1 - \cos t)$$

$$y = y_M - R_M \sin(\phi + \theta_M) \sin\phi(1 - \cos t)$$

$$z = R_M \sin(\phi + \theta_M) \sin t$$

where $(x_M, y_M, 0, R_M, \theta_M)$ is the quintuplet associated with a corresponding point of said sequence of points and t is a real parameter ranging over the interval $0 \leq t \leq 2\pi$.

7. A method of making an improved ophthalmic lens as defined in claim 6 in which said one surface of said first viewing zone is generated by combining together to form said surface a multiplicity of circles developed by passing an inclined plane disposed at a predetermined angle relative to said axis of the lens through a multiplicity of spheres of predetermined radius, each of said spheres passing through said sequence of points defining said meridional curve, wherein said radius of said spheres and said angle of said plane is selected so that:

(a) the portion of said meridional curve included in said first viewing zone is a circular arc of radius $R_o > 0$ defined by the equation $$X_M = R_o - (R_o^2 - Y_M^2)^{\frac{1}{2}}; \text{ and}$$

(b) all points in said first viewing zone have coordinates $(\bar{x}, \bar{y}, \bar{z})$ satisfying both the inequality $$(1 + \frac{\bar{y}}{R_o \cos\phi \sin\phi})^2 + (\frac{\bar{z}}{R_o \cos\phi})^2 \geq 1$$

and the equation $$\bar{x} = R_o - (R_o^2 - \bar{y}^2 - \bar{z}^2)^{\frac{1}{2}}.$$

8. A method of making an improved ophthalmic lens as defined in claim 7 in which said one surface of said third viewing zone is generated by combining together to form said surface a multiplicity of circles developed by passing an inclined plane disposed at a predetermined angle realtive to said x axis of the lens through a multiplicity of spheres of predetermined radius, each of said spheres passing through said sequence of points defining said meridional curve, wherein said radius of said spheres and said angle of said plane is selected so that all points in said third viewing zone have coordinates $(\bar{x}, \bar{y}, \bar{z})$ satisfying both the inequality $$(1 + \frac{\bar{g} - y_{\bar{M}}}{R \sin(\phi + \theta_{\bar{M}}) \sin\phi})^2 + (\frac{\bar{z}}{R \sin(\phi + \theta_{\bar{M}})})^2 \leq 1$$

and the equation $$\bar{x} = \hat{x} - (R^2 - (\bar{y} - \hat{y})^2 - \bar{z}^2)^{\frac{1}{2}}$$

where $$\hat{x} = x_{\bar{M}} + R \sin\theta_{\bar{M}}, \quad \hat{y} = y_{\bar{M}} - R \cos\theta_{\bar{M}}.$$

* * * * *